United States Patent [19]

Miller et al.

[11] 4,000,752
[45] Jan. 4, 1977

[54] DOUBLE-JET ACTING TRAP PRIMER
[75] Inventors: Louis M. Miller, Haverhill; Rand H. Ackroyd, Methuen, both of Mass.
[73] Assignee: Watts Regulator Co., Lawrence, Mass.
[22] Filed: June 9, 1975
[21] Appl. No.: 584,737
[52] U.S. Cl. .............................................. 137/118
[51] Int. Cl.² ..................................... F16K 31/143
[58] Field of Search ............. 137/118, 247, 247.25
[56] References Cited
UNITED STATES PATENTS
| | | | |
|---|---|---|---|
| 2,496,465 | 2/1950 | Goss | 137/118 |
| R20,642 | 2/1938 | Goss | 137/118 |

*Primary Examiner*—Robert G. Nilson
*Attorney, Agent, or Firm*—Kenway & Jenney

[57] ABSTRACT

A flow-through or in line type trap primer adapted to deliver a first metered spurt of water through a primer flow passage to a trap upon the initiation of flow in a supply line, and a second metered spurt of water upon the termination of such flow. A reaction disc in the main flow passage causes a stem to translate between two positions, and means cooperating with the stem cause the primer flow passage to be closed at said two positions and open as the stem moves between said positions. Manual as well as automatic priming is provided for.

12 Claims, 2 Drawing Figures

4,000,752

DOUBLE-JET ACTING TRAP PRIMER

BRIEF SUMMARY OF THE INVENTION

This invention relates to trap primers of the flow-through or in line type, that is, primers having a body connected in a supply line to a fixture and adapted to divert a portion of the water flowing in the line to a trap. Typically, on the demand of a fixture connected to the supply line the trap primer is activated by sensing the flow through it and dispenses water to the fixture trap. Such primers have been used for many years to make up for water lost from the trap by evaporation, thereby preventing the loss of water seal and the consequent escape of sewer gases.

A typical fault of flow-through pipe trap primers is that they waste water by permitting it to flow to the trap as long as the flow is passing through to the fixture. It is a primary object of this invention to avoid this waste of water in trap primers of the described type.

A further defect in previously proposed trap primer designs has been the tendency to become clogged with sediment or other matter built up upon the parts, interfering with their proper operation and causing uncertainty as to the sufficiency of flow to the trap. A second object of this invention is to provide a structure that has self-cleansing properties, whereby reliable operation is assured.

A further difficulty with many trap primers is that they are difficult to service to ensure that they will maintain the water seal in the trap. As a consequence, it is usually necessary to rely on the periodic demand of the system and the consequent periodic flow of water through the primer valve to tend to clean it sufficiently to allow proper flow to the trap, there being no means for direct manual operation. A further object of this invention is to provide means for manually testing the trap primer and priming the trap at will, thus providing a direct check on the functioning capability of the trap primer and on the adequacy of water in the trap seal.

With the foregoing objects and others hereinafter appearing in view, this invention features a construction including a stem that extends through an aperture in a partition separating inlet and outlet chambers within the body of the device, the stem also extending through a valve seat in the primer flow passage. The stem carries a trap disc for closing the valve seat and a reaction disc situated in the aperture so as to respond to the flow of water through the main flow passage. The stem is further provided with sealing means in the form of a closing ring for closing the primer flow passage at a position downstream of the valve seat when the trap disc has moved a predetermined distance from the valve seat. Thus a metered spurt or jet pulse of water is delivered into the primer flow passage only during periods of movement of the stem between two positions, one of which corresponds to the absence of flow in the main flow passage, and the other of which corresponds to the continued flow of water to the fixture after the stem has moved in response to the initiation of such flow.

By the foregoing arrangement, for any given demand flow rate, the two jet pulses will deliver the same total quantity of water to the trap without regard to the duration of flow to the mixture. Thus wasteful excess water flow to the trap is prevented.

The features of this invention further include sealing means of resilient construction for the primer flow passage, whereby these flexible parts are situated with respect to associated structures so as to resist the build-up of sediment or other matter of operation.

A further feature resides in structures for manually testing and priming the trap at will by manually lifting the stem to a position intermediate its normal extremities of movement. By this means any desired quantity of water may be caused to flow into the trap.

Other features of the invention reside in certain details of construction, and in modes of operation that will be more readily understood from the following description of the preferred embodiment.

DETAILED DESCRIPTION

Figure 1:
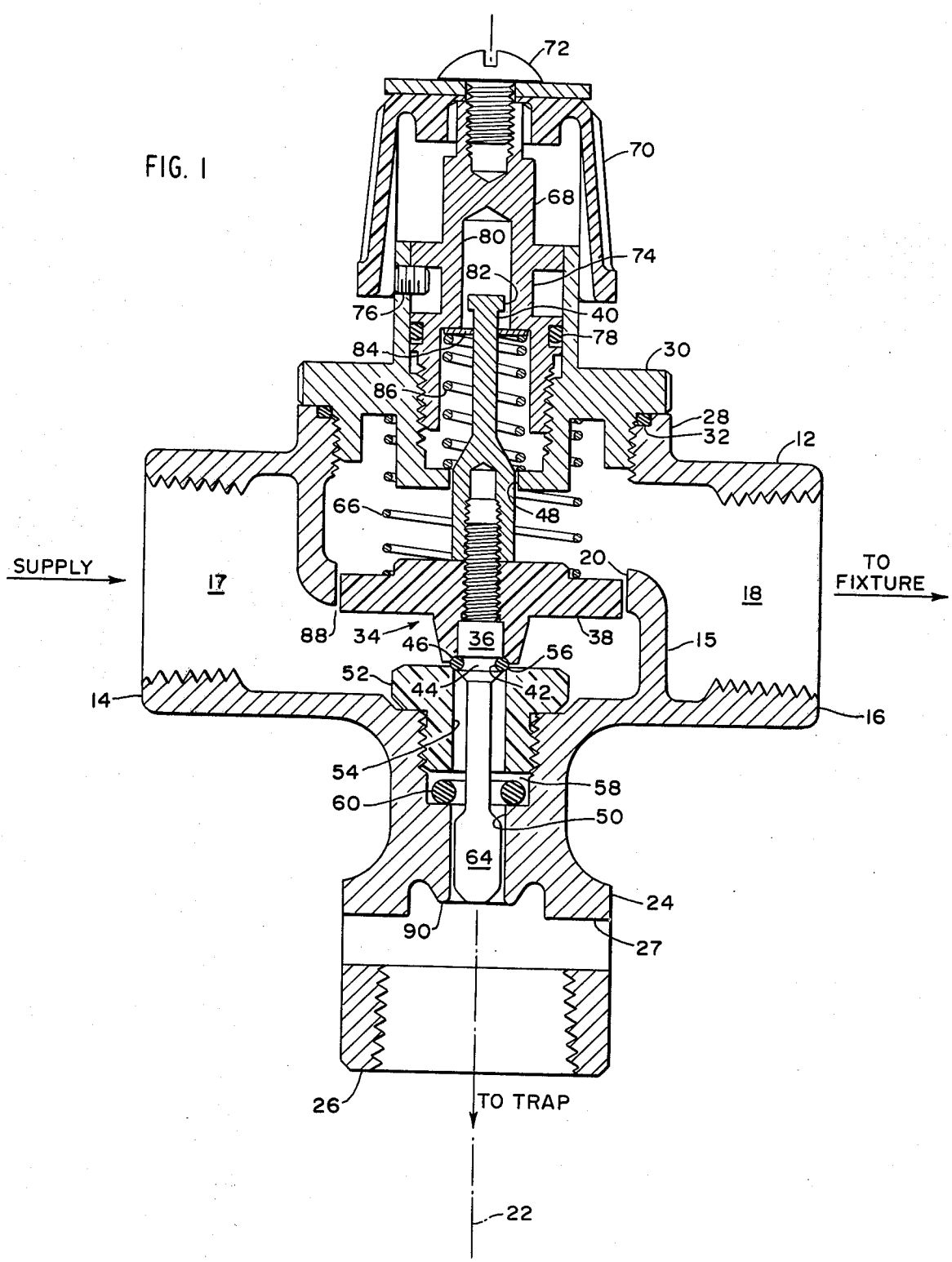
FIG. 1 is an elevation in section of the preferred embodiment showing the trap primer in the position corresponding to no flow to the fixture.

The preferred form of the invention comprises a body 12, preferably of metal such as brass, which forms a main flow passage from an internally threaded end 14 for connection to a water supply, through a partition 15 to an internally threaded end 16 for connection to a pipe line leading to a fixture. The partition defines an inlet chamber 17 and an outlet chamber 18. The fixture is assumed to be equipped with the usual valve or valves for operation according to water demand. The flow passes through a circular aperture 20 formed in the partition on an axis 22 transverse to the main flow passage.

The body 12 has an integral trap fitting 24 formed symmetrically about the axis 22 with an internally threaded end 26 for connection to a pipe leading to a trap for the same or some other fixture or fixtures, for example a floor drain trap. One or more transverse holes 27 maintain an air gap at the trap connection to prevent back-siphonage from the trap.

The body 12 has a bonnet fitting 28 symmetrical about the axis 22 and internally threaded to receive a bonnet 30, preferably with an O-ring seal 32.

A composite stem structure designated generally at 34 comprises an elongate part 36 having a threaded end, a reaction disc 38 of somewhat smaller diameter than the aperture 20 threaded on said end, an extension 40 bored and tapped for threading onto said end, and an O-ring seal 42 fitting within a conforming groove 44 in the part 36, the O-ring being further supported by a conforming surface 46 formed on an end of the reaction disc 38. The O-ring 42 comprises a trap disc.

The stem structure 34 is received within an aperture 48 formed in the bonnet 30 and also within a primer flow passage 50 formed in the trap fitting 24 on the axis 22. A seat member 52 is threaded into a counterbore in the passage 50 and has a central bore 54 of the same diameter with a seating surface 56 formed to cooperate with the O-ring 42. The seat member 52 is partially threaded into the counterbore to provide a recess 58. An O-ring or closing ring 60 of rubber or other suitable resilient material is loosely received in the recess 58 and has a smaller inner diameter than the passage 50. The part 36 is formed with an undercut portion 62 of smaller diameter than the inner diameter of the O-ring 60 and a full diameter portion 64 of larger diameter than the inner diameter of the O-ring 60. When the O-ring 42 is seated upon the seat 52, the undercut portion 62 is situated within the O-ring 60, and the stem 34 must move a predetermined distance along the axis 22 before the full diameter portion 64 reaches the O-ring 60.

A compression coil spring 66 is situated within a recess in the bonnet 30 and bears against the reaction disc 38, thereby tending to force the stem 34 in a direction to close the primer flow passage.

The parts described above comprise the portion of the trap primer that provides its main function of automatic response to water flow in the main flow passage, as hereinafter more particularly described. In addition, a further structure is provided to permit manual testing and priming of the trap. This structure includes an end plug 68 threaded into the bonnet and a knob 70 affixed by a screw 72 in the end of the plug to rotate it manually in relation to the bonnet. The plug has a groove 74, and a set screw 76 threaded into the bonnet projects into this groove to limit the axial extent of movement of the plug. An O-ring 78 received in another groove in the plug seals against a cylindrical sliding surface on the bonnet. The plug has an axial bore 80 for receiving the extension 40 and limiting its axial movement. This latter part has a projecting end portion 82. A spring washer 84 fits slidably about the member 40, has an inner diameter smaller than the projection 82 to interfere therewith, and a sufficiently large outer diameter to seat upon an internal shoulder of the plug. A compression spring 86 bears at one end upon the bonnet and at the other end upon the washer 84.

The end plug and bonnet are preferably formed of brass rod stock. The parts 36 and 40 of the stem structure are preferably of stainless steel. The reaction disc 38 and seat 52 are preferably made of plastic material.

For normal automatic operation, when the trap primer is installed with suitable connections to the supply, fixture and trap, the parts assume the positions shown in FIG. 1 when the fixture is shut off. The annular space 88 between the reaction disc 38 and the aperture 20 permits the pressure to equalize between the inlet and outlet chambers 17 and 18. Thereby the pressure forces tending to hold the O-ring 42 against the valve seat 56 exceed the pressure forces tending to unseat the valve because the respective effective areas opposed to these pressure forces differ by the area of the valve seat 56. Additional force tending to close the valve is supplied by the compression spring 66.

Figure 2:
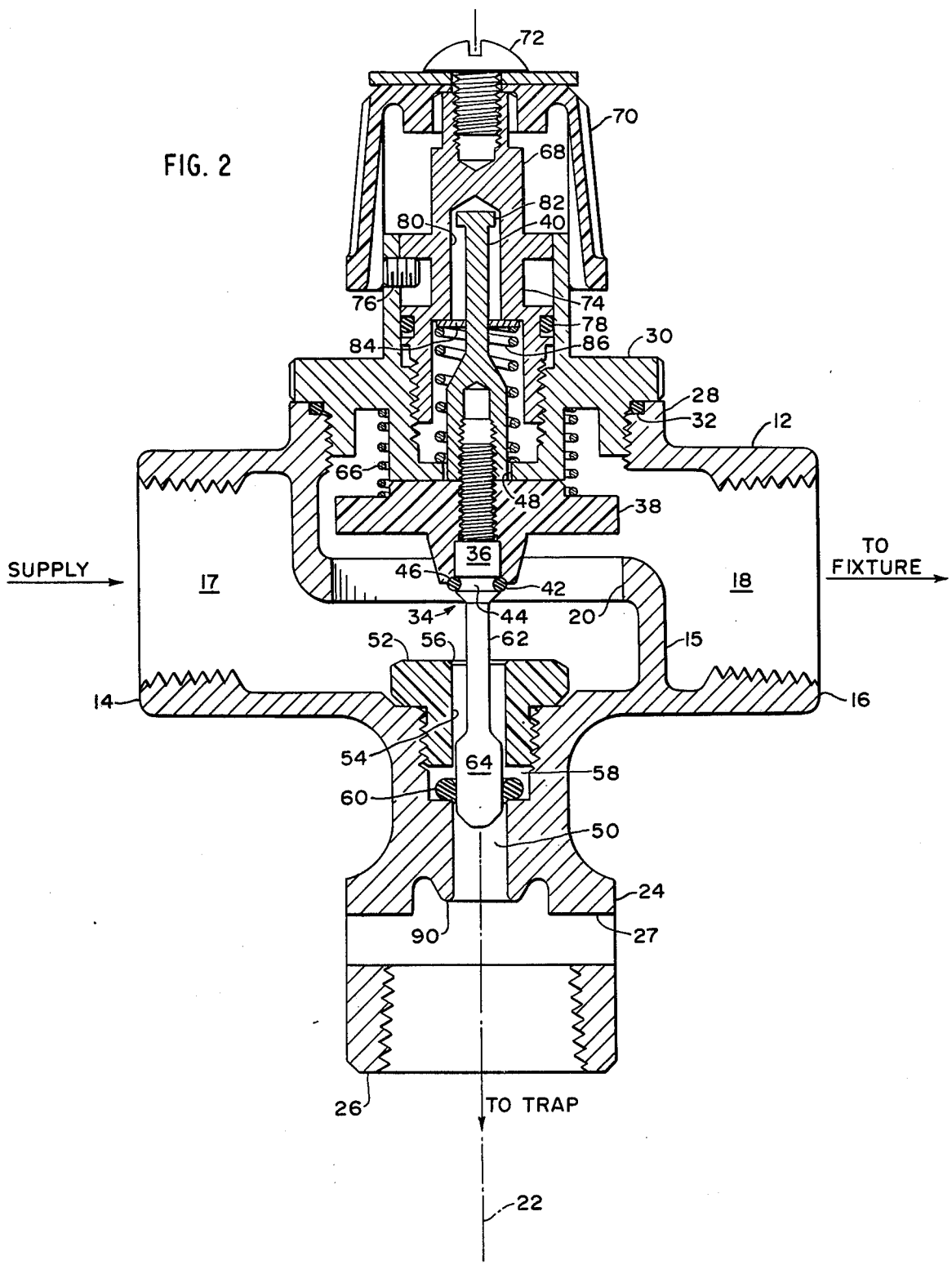
FIG. 2 is an elevation in section of the same embodiment corresponding to the condition of continued flow to the fixture after the stem has moved in response to the initiation of such flow.

Upon the opening of a valve at the fixture and the consequent flow of water, the pressure in the outlet chamber is reduced with respect to that in the inlet chamber, unbalancing the pressure forces on the reaction disc 38 in a direction causing the stem structure 34 to move against the force of the spring 66 from the position of FIG. 1 to that of FIG. 2 in which the reaction disc 38 abuts the bonnet.

In the position of FIG. 2 the reaction disc 38 is substantially completely removed from the aperture 20, thereby allowing maximum flow in the main flow passage with a minimum pressure drop, in contrast to many trap primers in the prior art.

Immediately upon the initiation of the foregoing movement of the stem structure, the O-ring 42 unseats and permits water from the inlet chamber 17 to pass around the full diameter portion 64 of the elongate part 36 and through the primer flow passage 50 to the trap. This flow continues until the stem structure has moved a predetermined distance sufficient to cause the portion 64 to engage and slightly distend the inner diameter of the closing O-ring 60. This causes the ring 60, which is subjected over a large part of its surface area to the inlet chamber pressure then in communication with the recess 58, to be subjected to atmospheric pressure over another portion of its surface area by communication with the air gap holes 27. This causes the ring 60 to seal firmly between the full diameter portion 64 of the stem and the wall of the primer flow passage.

During the time period between the unseating of the trap disc O-ring 42 and the sealing action of the closing O-ring 60, a metered spurt or jet pulse of water is delivered to the trap. Preferably, the end of the passage 50 is contoured at 90 to form a nozzle, preventing water from being expelled through the vent holes 27. After the spurt is shut off, as long as flow continues to the fixture the parts remain in the position of FIG. 2 and no further water flows to the trap.

When the fixture is shut off, pressure builds up within the outlet chamber and eventually the pressure forces tending to seat the trap disc O-ring 42 rise to a sufficient level to force the stem to return to the position of FIG. 1. During this movement, a similar jet pulse or spurt of water is delivered to the trap by reversal of the above-described action.

It will be observed that the spurts of water, passing adjacent the resilient O-rings 42 and 60 as described above, act in conjunction with the resilient distortions of these rings as they seat and unseat, in such manner as to tend to dislodge any sediment or other material deposits thereon. It has been found that the particular configuration described herein is very effective for aiding in the self-cleansing action, and thereby maintenance problems are substantially reduced.

With the parts in the position of FIG. 1, if it is desired to prime the trap manually, for example at the time of initial installation, or if it is at any time desired to cause water to flow through the primer flow passage to dislodge and force out any accumulated sediment, the knob 70 is manually rotated until the end plug 68 is stopped by the set screw 76. In the final portion of this movement the spring washer 84 abuts the projection 82 and lifts the stem structure 34 sufficiently to unseat the trap disc O-ring 42. Water from the inlet chamber then flows to the trap. Thereafter, the knob 70 is rotated back to the initial position and the parts are ready to resume automatic operation as described above.

It will be understood that the described embodiment is designed for assembly of the parts through the bonnet fitting of the body. Also, because of the enlarged diameters at both ends of the extension 40 on the stem structure, the washer 84 is preferably open slotted so that it may be slipped laterally into position.

It will also be noted that the trap disc O-ring 42 has conforming fit with the groove 44 on the part 36, with the surface 46 on the end of the reaction disc 38 and with the seating surface 56. The parts 36 and 38 together preferably conform to substantially more than half (in the illustrated embodiment approximately three-quarters) of the surface area of the O-ring. This support for the O-ring ensures a complete seal when the trap disc is closed.

We claim:
1. A trap primer having, in combination,
a body forming a main flow passage with a partition separating inlet and outlet chambers therein re- spectively adapted for connection to a supply line and fixture, the partition having an aperture, the body having a primer flow passage for connection to a trap and communicating with the inlet chamber through a valve seat, a stem having a trap disc and a reaction disc and movable to a position in which the trap disc closes the valve seat with the reaction disc located with annular clearance substantially in the aperture, the stem being extended through the valve seat in the direction of the trap by a first portion of reduced diameter and a second portion of relatively larger diameter, and annular sealing means in the primer flow passage, said first portion having clearance with the sealing means in said position and said second portion entering through and in annular sealing relation to said sealing means upon movement of the stem to and beyond a predetermined distance from said position.

2. A trap primer according to claim 1, with means for resiliently urging the stem in a direction to close the valve seat.

3. A trap primer according to claim 1, in which the annular sealing means is resilient and has an inner diameter greater than that of said first portion and smaller than that of said second portion.

4. A trap primer according to claim 3, in which the body has a counterbore for the primer flow passage, and including a trap seat secured in the counterbore in position to define a recess loosely confining said annular sealing means, having a flow passage and forming said valve seat at one end thereof.

5. A trap primer according to claim 4, in which inlet pressure communicating with said recess forces the annular sealing means to seal the primer flow passage between the body and said second portion upon entry of said second portion into the annular sealing means.

6. A trap primer according to claim 5, in which the annular sealing means is of substantially circular cross section.

7. A trap primer according to claim 1, in which the trap disc comprises a resilient ring and the stem has a groove to receive the ring and which confines a portion of the ring surface adjacent its inner diameter.

8. A trap primer according to claim 7, including support means on the stem confining an additional portion of the ring surface opposite the valve seat.

9. A trap primer according to claim 8, in which the support means comprises an extension of the reaction disc, and said groove and extension together conform to substantially over half the circumference of the cross-section of the ring.

10. A trap primer for connection in a supply line to a fixture having, in combination, a body forming a main flow passage with a partition separating inlet and outlet chambers therein respectively adapted for connection to the supply and fixture, the partition having an aperture, the body having a primer flow passage for connection to a trap and communicating with the inlet chamber through a valve seat, a stem extending through the aperture and valve seat and having a trap disc for closing the valve seat and sealing means for closing the primer flow passage at a position downstream of the valve seat when the trap disc has moved a predetermined distance from the valve seat, means threaded in the body and manually rotatable to lift the trap disc from the valve seat, means for resiliently urging the stem in a direction to close the valve seat, and a reaction disc on the stem substantially in the aperture when the valve seat is closed and adapted for moving said predetermined distance into the outlet chamber in response to a pressure differential between the inlet and outlet chambers.

11. A trap primer according to claim 10, having a bonnet threaded in the body and having a threaded bore, and an end plug threaded in said bore and having a manually rotatable portion and a portion adapted for lifting the stem in a direction to lift the trap disc from the valve seat.

12. A trap primer according to claim 11, in which the bonnet forms a bearing for the stem, and including a washer surrounding the stem and adapted to engage a lateral projection therefrom, and a compression spring seated on the bonnet and urging the washer toward said projection, the end plug having means to restrain the washer from reaching said projection when the valve seat is closed and the end plug is at one limit of its rotatable movement.

* * * * *